United States Patent
Limanjaya

(10) Patent No.: US 7,033,535 B1
(45) Date of Patent: Apr. 25, 2006

(54) P.E.T. OFF-CENTER NECK BOTTLE AND ITS MANUFACTURING METHOD

(76) Inventor: Tjandra Limanjaya, j1.Kaji 1 B-BA, Petojo Utara, Jakarta Pusat 10730, Indonesian (ID)

( * ) Notice: Subject to any disclaimer, the term of this patent is extended or adjusted under 35 U.S.C. 154(b) by 0 days.

(21) Appl. No.: 10/048,776

(22) PCT Filed: Oct. 1, 1999

(86) PCT No.: PCT/IB99/01615

§ 371 (c)(1),
(2), (4) Date: Apr. 22, 2002

(87) PCT Pub. No.: WO01/08868

PCT Pub. Date: Feb. 8, 2001

Related U.S. Application Data

(63) Continuation-in-part of application No. 09/366,312, filed on Aug. 2, 1999, now abandoned.

(51) Int. Cl.
*B29C 49/12* (2006.01)
*B29C 49/02* (2006.01)

(52) U.S. Cl. .................. 264/533; 264/531; 264/534

(58) Field of Classification Search ............... 264/533, 264/534, 535, 526, 525, 531; 425/528, 529, 425/534

See application file for complete search history.

(56) References Cited

U.S. PATENT DOCUMENTS

| | | | | | |
|---|---|---|---|---|---|
| 3,408,692 A | * | 11/1968 | Schaich | ...................... | 425/532 |
| 3,608,017 A | * | 9/1971 | Cines | .......................... | 264/529 |
| 5,178,817 A | * | 1/1993 | Yamada et al. | ............. | 264/532 |

FOREIGN PATENT DOCUMENTS

EP        0361141        4/1990

OTHER PUBLICATIONS

Patent Abstracts of Japan, vol. 014, No. 286 (M-0986) Jun. 18, 1990 & JP 02 086424 A (Nissei EE S B Kikai KK), Mar. 27, 1990 abstract.

* cited by examiner

*Primary Examiner*—Michael P. Colaianni

(57) ABSTRACT

For the manufacture of a polyethylene terephalate (P.E.T.) bottle with an off-centre neck, a preform is heated and its body is slightly angled with respect to its neck by sideways displacement. The preform is inserted in a blowing mould. A tilted stretching rod is advanced into the preform at the same time as it is blown to shape in the mould. The finished bottle has its neck off-centre with respect to the rest of the bottle.

9 Claims, 3 Drawing Sheets

P.E.T. OFF-CENTER NECK BOTTLE AND ITS MANUFACTURING METHOD

This is a continuation-in-part of Application Ser. No. 09/366,312, filed Aug. 2, 1999, now abandoned.

BACKGROUND OF THE INVENTION

1. Field of the Invention

The present invention relates to a polyethylene terephalate (P.E.T.) off-centre neck bottle and its manufacturing method, and more particularly to such a P.E.T. bottle in which the neck of the released bottle is off-centre.

It is easy to control the pouring of liquid from such an off-set neck bottle. Also liquid can be quickly poured from the bottle.

2. Description of the Prior Art

Previously, plastic bottles have been manufactured by extrusion blow moulding from P.E. (polyethylene), P.P. (polypropylene) and P.V.C. (polyvinylchloride). However, these materials can release poisonous substances. They are not accepted by the FDA. The extrusion blow moulding process produces runners, which have to be manually trimmed. This is a waste of time and manpower. The runners can also cause environmental problems.

In the nineteen seventies, a new technology—injection stretch blowing—was invented. In injection stretch blowing, the material used is P.E.T. (polyethylene terephalate). It, is approved by the FDA for food packaging P.E.T. is more transparent, durable and lighter. Before long, most plastic bottles were made from P.E.T. The process for making a P.E.T. bottle is different from extrusion blowing. In the production of a P.E.T. bottle a preform must first be made by injection moulding. The preform must then be heated to the desired temperature, and next moved to a blowing mould for blowing into a bottle. The shape of a P.E.T. bottle is usually round, square or oval.

As mentioned, the production of the bottle as such must be preceded by the injection moulding of the preform. For reliable blowing, this should be placed in the centre of the blowing mould. Normally, in the production of a P.E.T bottle, the neck of the bottle is designed to be positioned centrally at the top of the bottle. Only by use of special machinery and extra labour, can an off-centre neck bottle be produced, therefore it is very rare to see off-centre neck P.E.T. bottles on the market. Nevertheless, if liquid is stored in central neck bottles, they must be tilted to a substantial angle for pouring, which is not easy. Moreover, it can be difficult to control the amount being poured out. Also the liquid tends to drip down the neck of the bottle. In the case of a large bottle containing oil, especially without a table to place it on, the whole bottle has to be lifted for pouring from it. Generally such a bottle is inconvenient to use.

OBJECT OF THE INVENTION

The object of the invention is to provide an improved P.E.T. bottle with an off-centre neck.

SUMMARY OF THE INVENTION

According, to one aspect of the invention, there is provided a method of injection stretch blowing, an off-centre neck P.E.T. bottle, the method consisting in the steps of
 injection moulding a preform comprising a neck and a stretchable and blowable body,
 angularly displacing the body with respect to the neck,
 stretching the body and
 blowing the body in a blowing mould to a finish-formed shape in which the neck is off-centre with respect to the body.

Preferably, the body is angularly displaced by lateral application of a displacement member against it; and the stretching is by means of a stretching rod inserted through the neck and arranged at an angle of tilt with respect to the neck. Normally, the angular displacement of the preform and the angle of tilt of the stretching rod will be substantially equal.

In the preferred embodiment, the body is angularly displaced with respect to the neck prior to being placed in the blowing mould; and the body of the preform is heated for stretching prior to its angular displacement.

According to a second aspect of the invention, there is provided an injection stretch blown P.E.T. bottle having, a neck which is offset with respect to the body of the bottle, the bottle having been blown by the method of the first aspect of the invention.

According to a third aspect of the invention there is provided apparatus for injection stretch blowing of a P.E.T. off-centre neck bottle, the apparatus including means for angular displacement of the body of a preform for the bottle with respect to its neck.

Preferably, the angular displacement means comprises an actuator for its displacement laterally of the angle of displacement of the body and an abutment shaped complementarily to the preform of the body.

In the preferred embodiment, the stretching pin is arranged parallel to the angle of displacement of the body of the preform when held in the apparatus for stretching.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 3:
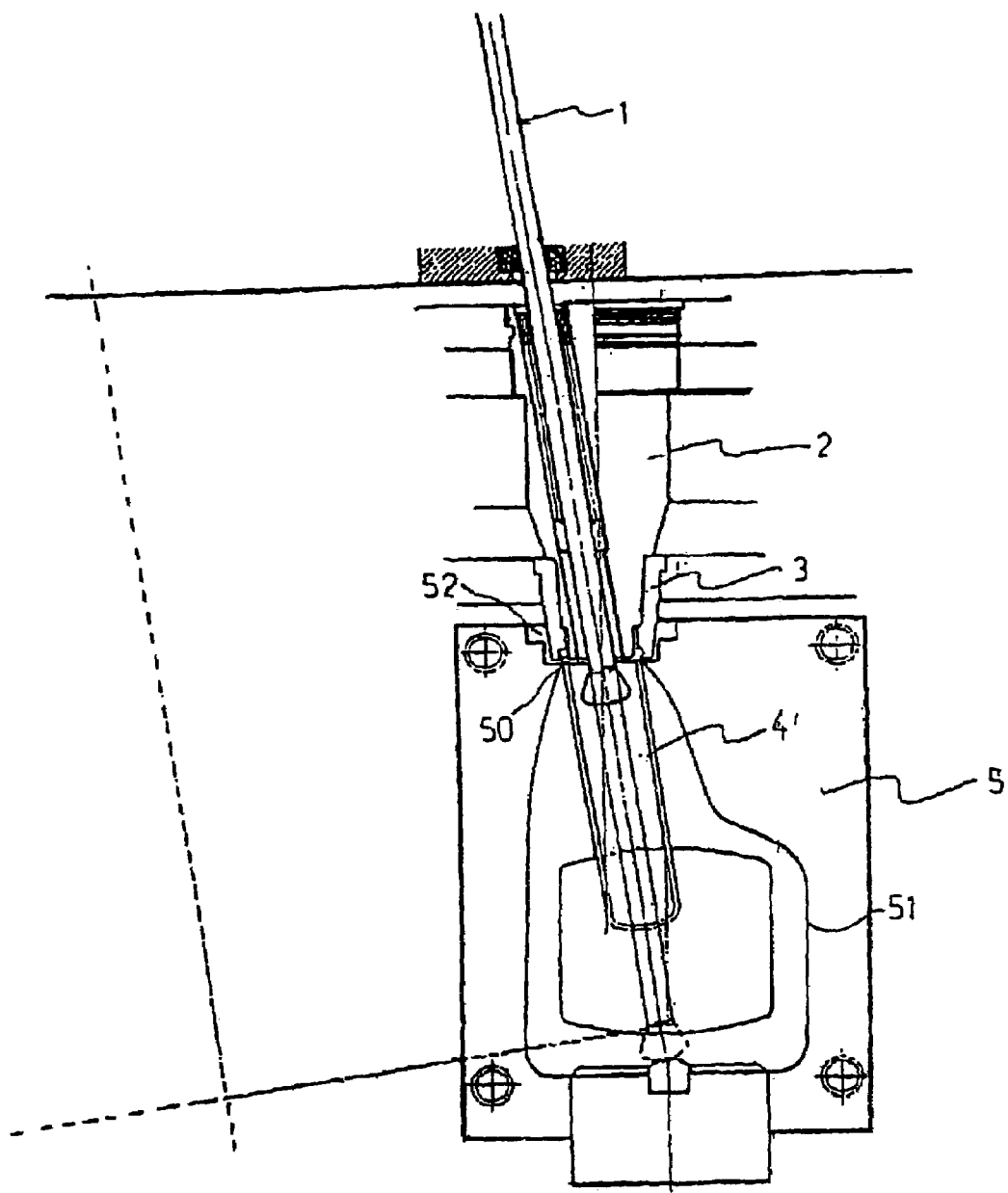
FIG. 3 is a cross-sectional side view of blow moulding apparatus in accordance with the invention.

Referring to FIG. 3, the stretch and blowing portion of the machine for producing, off-centre neck P.E.T. bottles is conventional in having a stretching pin 1, blowing bore 2, a neck mould 3 and a blowing mould 5. However, the stretching pin is tilted with respect to the orientation of the neck mould 3 and the neck mould is off-centre with respect to the blowing mould 5. In other words, the shape 51 of the bottle as defined by the blowing mould is such that the neck is set to one side of the bottle.

Figure 1:
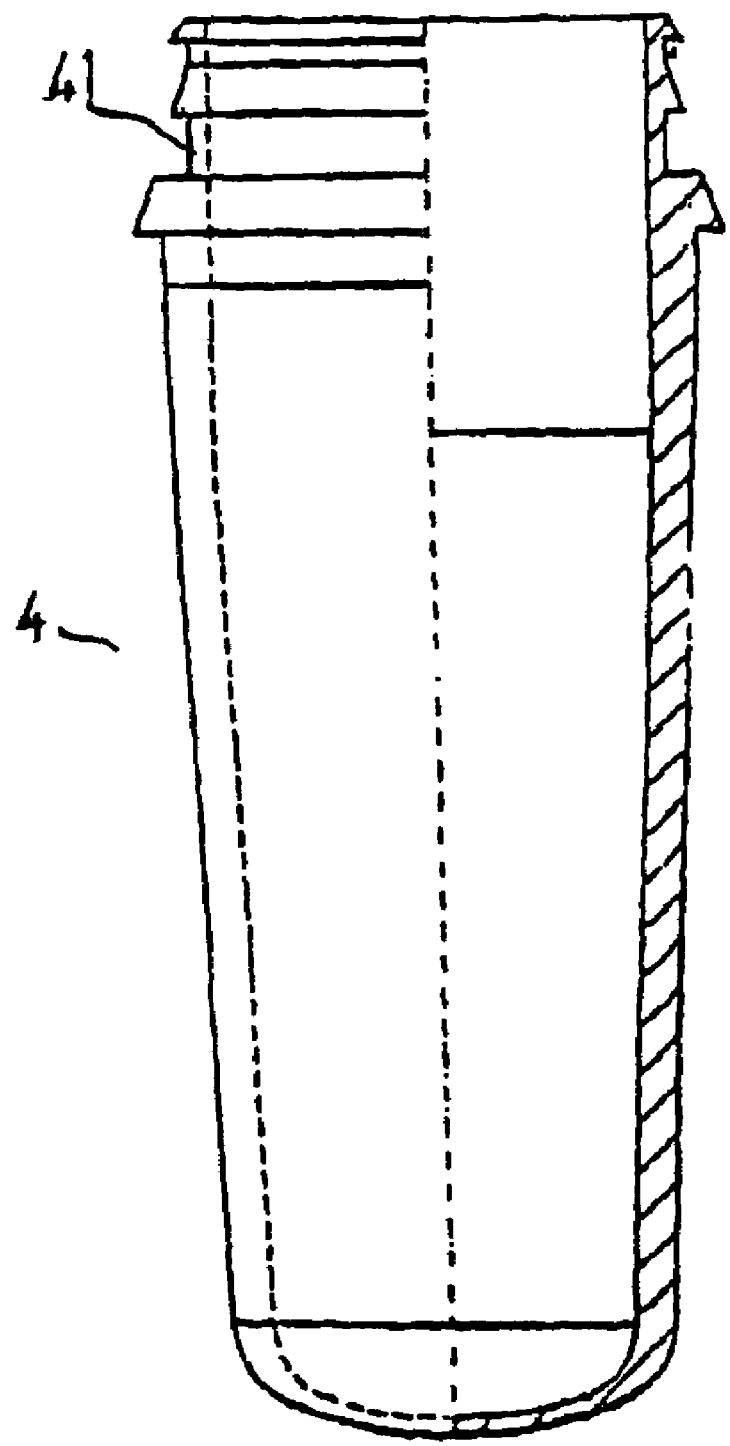
FIG. 1 is a cross-sectional view of a preform for a bottle in accordance with the invention.
Figure 2:
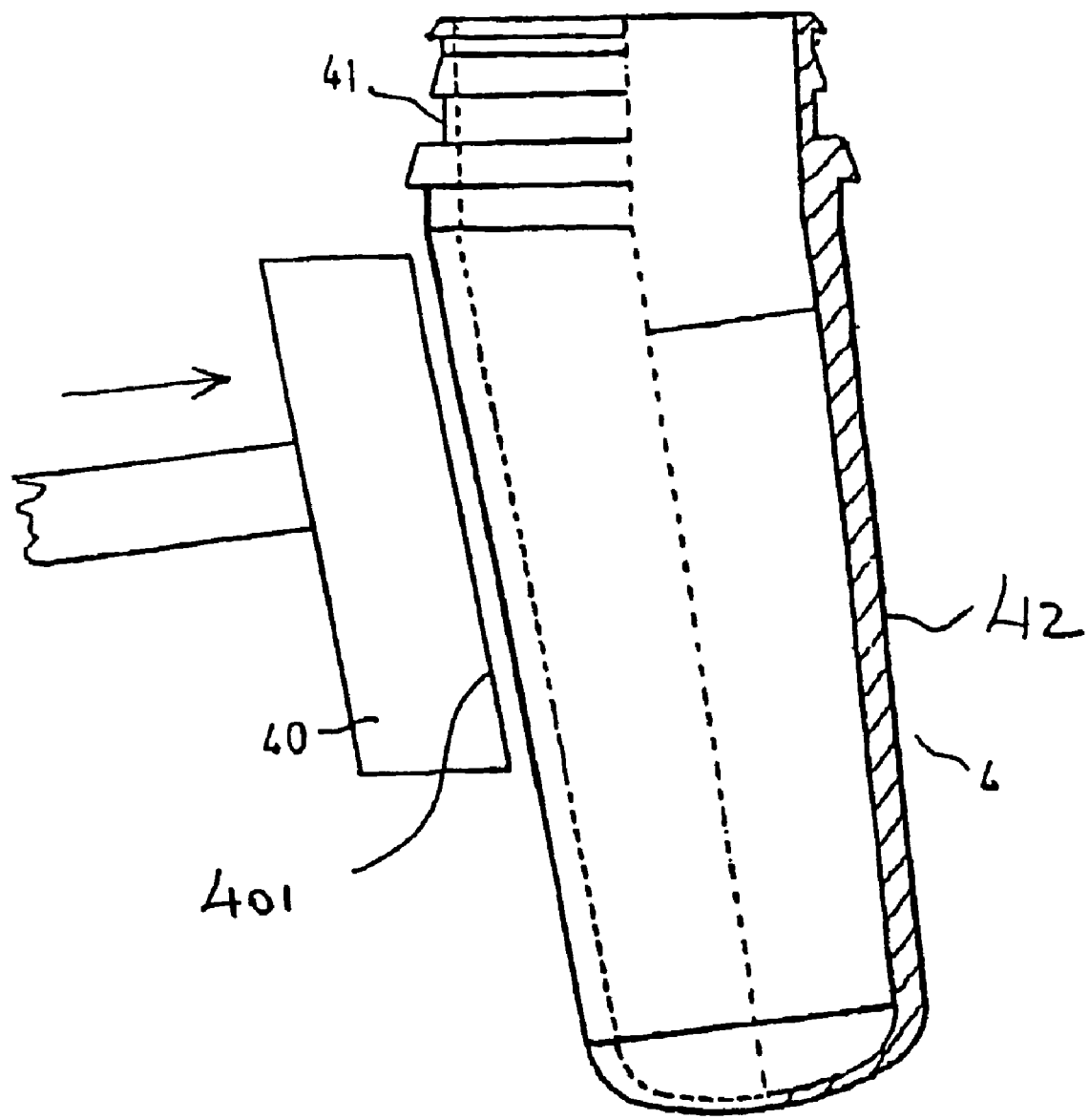
FIG. 2 is a similar view of the preform after forced displacement of a body of the preform.

Referring to FIGS. 1 & 2, the initial shape of the preform 4 is conventional. However, after moulding and heating of the preform 4, it is transferred to the blowing mould, where it is gripped in the neck 52 of the mould by the neck mould 3. Here, with the mould open and with the neck ring 41 gripped, the preform is forced sideways, by application against it of a mould plate 40. Thus the main body 42 of the preform is tilted with respect to the neck ring, 41. The mould plate is provided with an abutment face 401 which is shaped complementarily to the shape of the body of the preform and is angled with respect to the neck ring at the angle of tilt of the body 42. The mould plate is actuatable in a direction at right angles to its abutment face 401.

The stretching pin 1 is tilted to an angle corresponding to the angle of tilt of the body of the preform. After the preform has been deformed, the stretching pin is inserted into the preform and the mould is closed. The stretching pin is then advanced to stretch the preform. At the same time, the preform is blown internally via the blowing bore 2 into the shape of the bottle defined by the blowing mould 5.

After cooling, the mould is opened to release the bottle.

The neck is off-centre to one side of the bottle. This has the advantage that liquid contents can be quickly and easily poured from the neck with small tipping only of the bottle. After pouring of the desired amount, the bottle can easily be stood upright to stop the pouring, because the tipping angle is small and amount poured can be easily controlled. The liquid is unlikely to drip from the brim of the neck.

This is achieved with a suitably designed blowing mould, slight tilting of the stretching pin and application of the mould plate to the preform body for tilting it. Special machinery is not required. All that is required is minor modification of standard machinery, whereby mass production of off-centre neck bottles is possible at an economic price.

It should be noted that the invention is not intended to restricted to the details of the above described embodiment.

What is claimed is:

1. A method of injection stretch blowing an off-centre neck P.E.T. bottle, the method consisting in the steps of
    injection moulding a preform comprising a neck and a stretchable and blowable body,
    angularly displacing the body with respect to the neck,
    after angularly displacing the body with respect to the neck, stretching the body with an entirely straight stretching rod, and
    after stretching the body, blowing the body in a blowing mould to a finish-formed shape in which the neck is off-centre with respect to the body.

2. A method as claimed in claim 1, wherein the body is angularly displaced by lateral application of a displacement member against it.

3. A method as claimed in claim 2, wherein the stretching is by means of the stretching rod being inserted through the neck and arranged at an angle of tilt with respect to the neck.

4. A method as claimed in claim 3, wherein the angular displacement of the preform and the angle of tilt of the stretching rod are substantially equal.

5. A method as claimed in claim 4, wherein the body is angularly displaced with respect to the neck at the blowing mould, prior to its closure.

6. A method as claimed in claim 5, wherein the body of the preform is heated for stretching prior to its angular displacement.

7. A method as claimed in claim 1, wherein the stretching is by means of the stretching rod being inserted through the neck and arranged at an angle of tilt with respect to the neck.

8. A method as claimed in claim 7, wherein the angular displacement of the preform and the angle of tilt of the stretching rod are substantially equal.

9. A method as claimed in claim 8, wherein the body is angularly displaced with respect to the neck at the blowing mould, prior to its closure.

* * * * *